United States Patent
Hsieh

[11] Patent Number: 6,137,245
[45] Date of Patent: Oct. 24, 2000

[54] CIRCUIT FOR GENERATING CONTROL GRID VOLTAGE FOR CATHODE RAY TUBE

[75] Inventor: Chang-Fa Hsieh, Taipei Hsien, Taiwan

[73] Assignee: Acer Communications and Multimedia Inc., Taiwan

[21] Appl. No.: 09/092,910

[22] Filed: Jun. 8, 1998

[30] Foreign Application Priority Data

Feb. 17, 1998 [TW] Taiwan ................................. 87202242

[51] Int. Cl.[7] .............................. G09G 1/04; H01J 29/70
[52] U.S. Cl. ........................................... 315/383; 315/411
[58] Field of Search ..................................... 315/411, 383, 315/381

[56] References Cited

U.S. PATENT DOCUMENTS

| | | | |
|---|---|---|---|
| 3,560,653 | 2/1971 | Dias | 179/15 |
| 3,919,598 | 11/1975 | Samizo | 315/385 |
| 4,218,720 | 8/1980 | Kam et al. | 361/93 |
| 5,604,404 | 2/1997 | Sahara | 315/8 |

*Primary Examiner*—Seungsook Ham
*Assistant Examiner*—John Patti
*Attorney, Agent, or Firm*—Pillsbury Madison & Sutro LLP

[57] ABSTRACT

A control grid voltage generating circuit comprises a high voltage source, a low voltage source and an amplifier biased by the high/low voltage sources. The high voltage source is coupled to the ground through a low-impedance path. The amplifier receives an input signal and generates a control grid voltage in response to the input signal. When the CRT is powered off, the amplifier can be rapidly discharged via the low-impedance path, thereby speedily turning off the amplifier. The control grid voltage is then driven to be the low reference voltage, thereby cutting off the electron beam and protecting the CRT.

8 Claims, 2 Drawing Sheets

CIRCUIT FOR GENERATING CONTROL GRID VOLTAGE FOR CATHODE RAY TUBE

BACKGROUND OF THE INVENTION

1. Field of the Invention

The present invention generally relates to a control circuit for a cathode ray tube, and more specifically to a circuit for generating a grid voltage for the cathode ray tube, which can be reduced to an extremely negative voltage level at the CRT power-off moment, thereby cutting off electron beams immediately and preventing phosphors on the screen from being damaged.

2. Description of the Related Art

Cathode ray tube display devices (CRT display) are one of widely used image display devices, such as monochrome or color televisions, monochrome or color computer display devices, and so on. The CRT display device comprises a cathode ray tube and a peripheral circuit. The function of the CRT is achieved by controlling the path of electron beams by the peripheral circuit to strike the phosphor-coated face of the CRT to radiate light.

FIG. 1 (Prior Art) is a cross-sectional view of a conventional CRT. Referring to FIG. 1, the CRT comprises a front-end portion for producing and accelerating the electron beam (including filament 10, cathode 12, control grid 13, screen grid 14, focusing grid 15 and accelerating anode 16 and deflection jokes 18), a middle portion for deflecting and accelerating the electron beam (including cavity 20 and anode button 22) and a palate portion for practically emitting light (including aluminum film 30, phosphor film 32 and screen 34). Filament 10 is heated by a filament voltage source (not shown) to produce hot electrons, which are then emitted through cathode 12. Generally, the filament voltage is about 6.3 volts. Control grid 13, screen grid 14, focusing grid 15 and accelerating anode 16, using the electrical focusing mechanism, converge the hot electrons emitted from cathode 12 to be electron beam 40. In addition, deflection yokes 18 using the generated electromagnetic field varies the direction of electron beam 40. Practically, deflection yokes 18 include a set of horizontal deflection yokes and a set of vertical deflection yokes. The two sets of deflection yokes, in response to a horizontal scanning synchronizing signal and a vertical scanning synchronizing signal, control the moving direction of electron beam 40, thereby making electron beam 40 to continuously scan the screen. Finally, electron beam 40, which is accelerated and deflected at a scanning angle θ, move straightly in cavity 20 of the CRT, until striking phosphor film 32 of the palate portion. Electron beam 40 is still influenced by the voltage on anode button 22 during the period of the movement in cavity 20.

In the above CRT, control grid 13 is used to control the number of electrons emitted from cathode 12, thereby adjusting the brightness of the displayed image. In the aspect of structure, control grid 13 like a cylindrical cap encloses cathode 13. In addition, there is a pinhole located at the tip of this cylindrical cap, serving as the passage for the moving hot electrons. Generally speaking, the voltage of control grid 13 is denoted by G1. Control grid voltage G1 has a negative polarity compared with the voltage of cathode 12 and is used for controlling the charge distribution on cathode 12. In more details, when control grid voltage G1 is more negative than the normal value, the number of the electrons emitted from cathode 12 decreases and the brightness of the displayed image is reduced. When control grid voltage G1 is more positive than the normal value, the number of the electrons emitted from cathode 12 increases and the brightness of the displayed image is enhanced. Therefore, control grid voltage G1 can be used to adjust the image brightness.

A problem may occur at the moment of CRT power-off. During the normal operation of the CRT display, electron beam 40 recursively and continuously strikes phosphors film 32 of the palate portion under the control of deflection yokes 18. More specifically, electron beam 40 sequentially scans every horizontal scanning lines on phosphor film 32 in the vertical direction. Therefore, every regions of phosphor film 32 is not continuously stimulated. When the CRT display is powered off, the voltage in the anode cannot immediately disappear due to the capacitance effect. Therefore, electron beam 40 is still emitted within a quite short period after the CRT is powered off. However, the scanning circuitry has already stopped working at the time. As a result, electron beam 40 may constantly strike a special region of the phosphor film 32 during this afterglow period. It is possible that phosphors in this special regions may be destroyed due to the constant striking. Therefore, the issue of the present invention is how to quickly cut off the electron beam at the CRT power-off moment, thereby protect the CRT screen.

The present invention adopts the above grid control voltage G1 to cut off the electron beam when the CRT is powered off. Furthermore, since the above-mentioned problem occurs at the moment of CRT power-off, control grid voltage G1 should be quickly driven to a voltage level to cut off the electron beam immediately.

SUMMARY OF THE INVENTION

Therefore, an object of the present invention is to provide a CRT control grid voltage generating circuit, which can drive the control grid voltage G1 to a negative voltage level that is low enough to cut off the electron beam in response to the CRT power-off, thereby protecting the CRT monitor.

Another object of the present invention is to provide a CRT control grid voltage generating circuit, in which the mechanism of the brightness control and blanking can be incorporated.

The present invention achieves the above-indicated objects by providing a control grid voltage generating circuit which includes a high voltage source, a low voltage source and an amplifier biased by the high/low voltage sources. The high voltage source is coupled to the ground through a low-impedance path. In addition, the high/low voltage sources serve as the high/low reference voltages of the amplifier, respectively. The amplifier receives an input signal and generates a control grid voltage in response to the input signal. When the CRT is powered off, the amplifier can be rapidly discharged via the low-impedance path coupled between the high voltage source and the ground, thereby speedily turning off the amplifier. The control grid voltage G1 is then driven to be the low reference voltage, thereby cutting off the electron beam. In the embodiment of the present invention, the high voltage source is implemented by the filament source since the filament can serve as the low-impedance path.

In addition, a micro-controller in the monitor can use pulse-width-modulation (PWM) signals to control the magnitude of the input signal of the amplifier, thereby adjusting the magnitude of the control grid voltage G1. In addition, a blanking control circuit can use a vertical blanking signal to turn off the above amplifier, thereby driving the control grid voltage G1 to the reference low voltage level during the blanking period.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
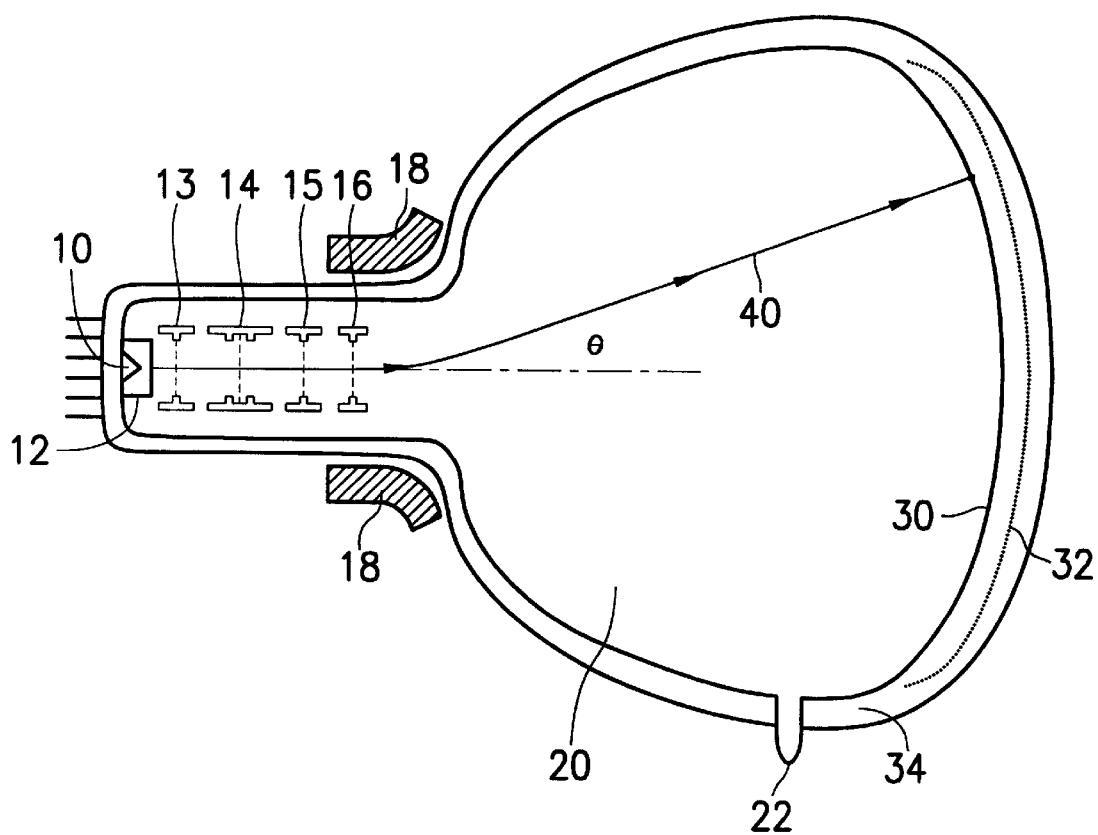
FIG. 1 (Prior Art) is a cross-section view of a conventional CRT.
Figure 2:
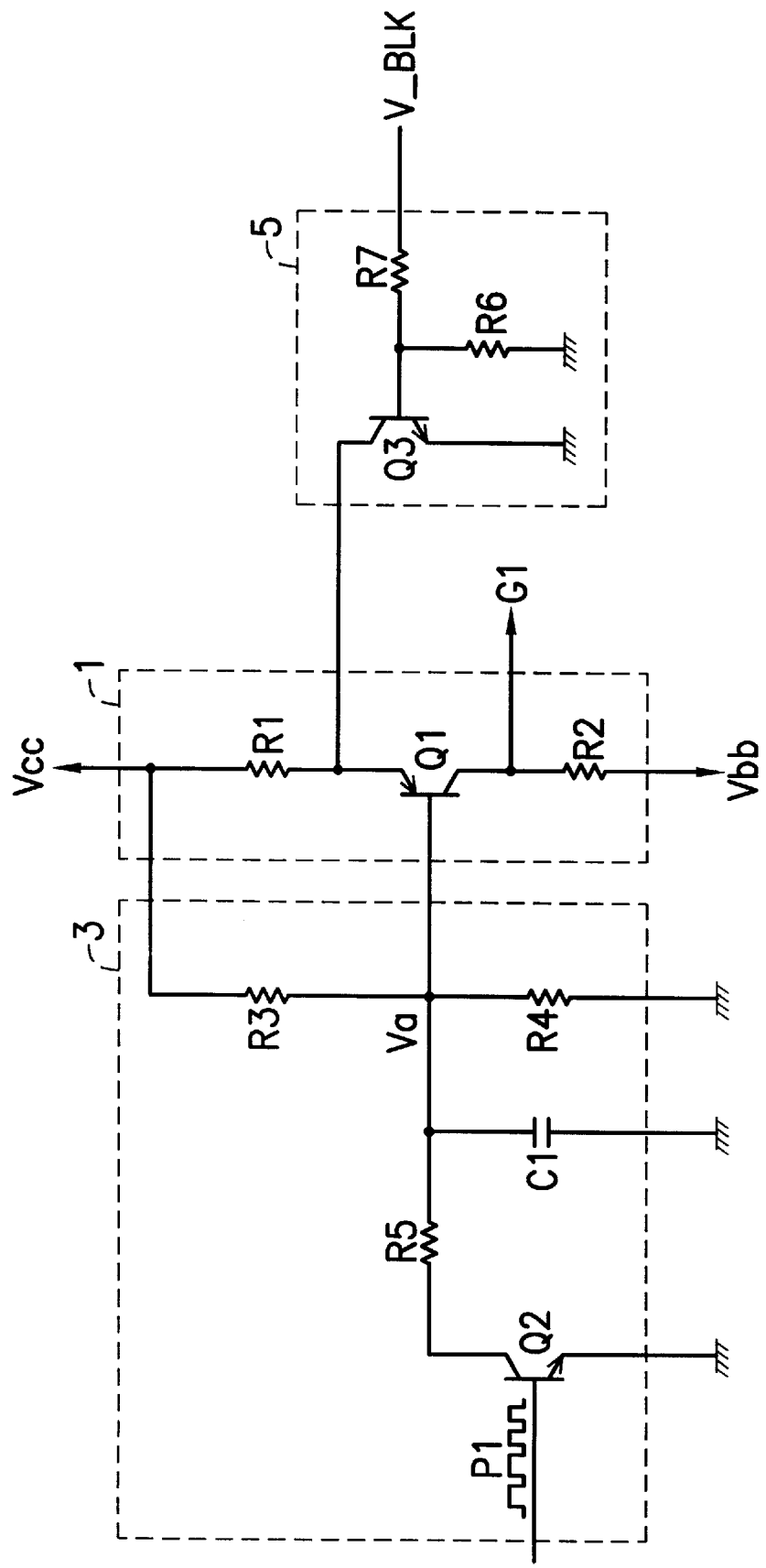
FIG. 2 is a detailed circuit diagram of the control grid voltage generating circuit in accordance with the present invention.

Refer to FIG. 2, which is a detailed circuit diagram of a control grid voltage generating circuit in this embodiment. As shown in FIG. 2, the control grid voltage generating circuit comprises amplifier circuit 1, voltage control circuit 3, blanking control circuit 5, and high/low voltage sources Vcc/Vbb. Voltage control circuit 3 together with a microcontroller (not shown) is used to control the brightness of the CRT (i.e. controlling the number of emitted hot electrons). Blanking control circuit 5 is used for blanking the vertical scanning of the electron beam. In addition, amplifier circuit 1, high-voltage source Vcc and low-voltage source Vbb, which will be described first in the following, are used for generating the control grid voltage G1.

Amplifier circuit 1, which is coupled between high-voltage source Vcc and low-voltage source Vbb, is used for receiving the input signal Va and generating the control grid voltage G1. Amplifier circuit 1 consists of a transistor Q1, a resistor R1 and a resistor R2. In this embodiment, the transistor Q1 is a PNP-type bipolar transistor. The emitter terminal and the collector terminal of transistor Q1 are connected to the resistor R1 and resistor R2 respectively. The base terminal of transistor Q1 is coupled to the input voltage Va. Therefore, the control grid voltage G1 supplied from the collector terminal is inversely proportional to the input voltage Va.

The high voltage source Vcc is coupled to the ground through a low-impedance path. The low-impedance path can serve as a discharge path when the CRT is powered off, thereby forcing the transistor Q1 to be quickly turned off.

In this embodiment, the high voltage source Vcc is implemented by the filament voltage source. This implementation manner has two advantages.

(1) The filament voltage source is used to provide a current flowing through the filament. Generally speaking, the filament voltage is about 6.3 volts and the resistance of the filament itself is about 10 ohms. Therefore, the filament can completely satisfy the requirement of the low-impedance path.

(2) The filament source has already embedded in the commercial CRTs. Therefore, no additional component is required for implementation and the fabrication cost is low.

Furthermore, since there is no additional power source, the circuit in the embodiment may not consume extra power.

The requirement of the low-voltage source Vbb is that the electron beam can be completely cut off when the low reference voltage provided by the low-voltage source Vbb is applied to the control grid 13. In this embodiment, the low reference voltage provided by the low-voltage source Vbb is about −200V, which is applicable to almost any types of electron guns. In addition, −200V voltage level can be drawn from a secondary winding of the fly-back transformer directly.

The operation of amplifier circuit 1, high-voltage source Vcc and low-voltage source Vbb can be described as follows. In the normal operation of the CRT, transistor Q1 is biased in the active region and serves as an amplifier. Therefore, the control grid voltage G1 varies with the input signal Va and the number of the emitted electrons varies with the control grid voltage G1. When the CRT is powered-off, transistor Q1 is discharged via the low-impedance path (or the filament) and rapidly turns off. When transistor Q1 is in an off state, it means that there is no collector current. Therefore, the control grid voltage G1 is reduced to the low reference voltage (−200V) and can be applied to control grid 13 to cut off the electron beam emitted from the cathode immediately. Accordingly, the CRT screen is under protection.

The voltage control circuit 3 is used to directly control the input voltage Va, thereby controlling the control grid voltage G1 that is used for adjusting the brightness of the displayed image. As shown in FIG. 2, the voltage control circuit 3 consists of resistor R3, resistor R4, resistor R5, capacitor C1 and transistor Q2. Resistor R3 is connected between the high-voltage source Vcc and the base of transistor Q1. Resistor R4 is connected between the base of the transistor Q1 and the ground. Resistor R3, R4 and R5 and transistor Q2 form a controllable voltage-dividing circuit for generating the input voltage Va in response to the high-voltage source Vcc. Resistor R5 and transistor Q2 in the voltage control circuit 3 can be used to achieve a control mechanism for controlling the magnitude of the input signal Va.

The combination of resistor R5 and transistor Q2 is connected to resistor R4 in parallel. The input voltage Va can be adjusted by the voltage-dividing ratio. A PWM signal P1 is applied to the base of transistor Q2. The modulated pulse P1 consists of a sequence of pulses generated by the micro-controller of the CRT. The micro-controller uses the user-defined brightness parameter to determine the pulse width, or called the duty cycle, of the signal P1. When the PWN signal P1 is in the logical high state, transistor Q2 turns on and the voltage-dividing ratio is changed since resistor R5 is electrically connected to resistor R4 in parallel. When the PWM signal P1 is in the logical low state, transistor Q2 turns off and the voltage-dividing ratio does not change since resistor R5 is electrically isolated from resistor R4. For this reason, the different pulse widths of pulses of the PWN signal P1 can set different the voltage-dividing ratio, thereby adjusting the input signal Va. Capacitor C1 uses as a filter to filter out the high-frequency signals induced by the on-off switching of transistor Q2.

The operation of voltage control circuit 3 is described as below. When the PWM signal P1 has a longer pulse width, the turn-on period of transistor Q2 becomes longer and the input signal Va decreases. As a result, the control grid voltage G1 increases and the brightness of the CRT also increases. On the other hand, when the PWM signal P1 has a shorter pulse width, the turn-on period of transistor Q2 become shorter and the input signal Va increases. As a result, the control grid voltage G1 decreases and the brightness of the CRT also decreases. Therefore, the control grid voltage G1 in this embodiment can be adjusted by the micro-controller of the CRT.

According to the vertical blanking signal $V_{13}$ BLK, blanking control circuit 5 controls the control grid voltage G1 to blank the electron beam during the blanking period. The blanking period is defined as the period in which the last scanning line flies back to the first scanning line. In general, the V_BLK is high during the blanking period and low during the non-blanking period. Referring to FIG. 2, blanking control circuit 5 consists of resistor R6, resistor R7 and NPN transistor Q3. Blanking control circuit 5 serves as a switching circuit. When the vertical blanking signal V_BLK is high, i.e. during the blanking period, transistor Q3 turns on. The voltage level at transistor Q1 emitter terminal is pulled down to the ground level and transistor Q1 is turned off. As a result, the control grid voltage G1 is reduced to the voltage level of low-voltage source Vbb (−200V), thereby blanking the electron beam. During the non-blanking period, the amplifier circuit is in normal operation mode since transistor Q3 is turned off. In the above description, the preferred embodiment is applied to perform vertical blanking, which does not limit the application of the present invention. For example, this present invention also can be applied to perform horizontal blanking.

In conclusion, the control grid voltage generating circuit can be operated in the three different modes.

1. Normal mode: In the normal mode, the control grid voltage G1 varies corresponding to the input signal Va. In addition, the input signal Va can be adjusted by the microcontroller of the CRT in response to a user-defined brightness parameter. When the PWM signal P1 has a longer pulse width, the input signal Va decreases and the control grid voltage G1 increases. As a result, the brightness of the CRT increases. When the PWM signal P1 has a shorter pulse width, the input signal Va increases and the control grid voltage G1 decreases. As a result, the brightness of the CRT decreases. Therefore, the brightness of the CRT is adjusted by the circuit of the embodiment.

2. Blanking mode: When a blanking signal is high, i.e. during the blanking period, transistor Q1 in the amplifier circuit 1 turns off and the control grid voltage G1 is reduced to 200V, which can be used to cut off the electron beam.

3. Power-off mode: when the CRT display is powered off, transistor Q1 discharges rapidly through the filament and turns off. The control grid voltage G1 is reduced to −200V to cut off the electron beam and protect the CRT.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A circuit for generating a control grid voltage for a CRT, comprising:

a high-voltage source for supplying a high reference voltage, the high-voltage source being coupled to the ground through a low-impedance path;

a low-voltage source for supplying a low reference voltage;

an amplifier circuit, coupled between the high-voltage source and the low-voltage source and biased by the high reference voltage and the low reference voltage, for receiving an input signal and generating the control grid voltage responsive to the input signal, the amplifier circuit being constructed and arranged to discharge to an off state through the low-impedance path coupled between the high-voltage source and the ground and arranged such that the control grid voltage is driven to be the low reference voltage to cut off an electron beam of the CRT when the CRT is powered off;

and a transistor coupled between a resistive network, said resistive network coupled to said amplifier circuit, and the ground and controlled by a pulse-width-modulation signal controlling the on/off states of the transistor for adjusted the input voltage generated at the junction of the resistive network.

2. The circuit of claim 1 wherein the high-voltage source is a filament source of the CRT.

3. The circuit of claim 1 wherein the low-voltage source is generated by a secondary winding of a fly-back transformer of the CRT.

4. The circuit of claim 1 wherein the amplifier circuit comprises:

a first resistor having a first end coupled to the high-voltage source;

a second resistor having a first end coupled to the low-voltage source; and a first transistor having an emitter terminal coupled to a second end of the first resistor, a base terminal for receiving the input voltage and a collector terminal coupled to a second end of the second resistor, the control grid voltage being provided by the collector terminal of the first transistor.

5. The circuit of claim 1 wherein the input voltage is generated by a voltage-dividing circuit in response to the reference high voltage.

6. The circuit of claim 5 wherein the voltage-dividing circuit comprises:

a third resistor coupled between the high-voltage source and the amplifier circuit;

a forth resistor coupled between the amplifier circuit and the ground;

a fifth resistor having a first end coupled to the amplifier circuit;

the transistor coupled between a second end of the fifth resistor and the ground and controlled by a pulse-width-modulation signal, the pulse-width-modulation signal controlling the on/off states of the transistor for adjusting the input voltage generated at the junction of the third resistor and the fourth resistor.

7. The circuit of claim 6 wherein the pulse-width-modulation signal is generated by a micro-controller.

8. The circuit of claim 1 further comprising a blanking circuit, coupled to the amplifier circuit and controlled by a blanking signal, for driving the amplifier circuit to an off state in response to the blanking signal, whereby the control grid voltage is driven to the reference low voltage during blanking periods.

* * * * *